United States Patent
Kim

(10) Patent No.: US 6,986,376 B1
(45) Date of Patent: Jan. 17, 2006

(54) DEVICE FOR ACTUATION OF ROLLERS USING A FEED TRAY IN A LAMINATOR

(75) Inventor: Yang-Pioung Kim, Seoul (KR)

(73) Assignee: GMP Co., Ltd., Paju-si (KR)

( * ) Notice: Subject to any disclaimer, the term of this patent is extended or adjusted under 35 U.S.C. 154(b) by 0 days.

(21) Appl. No.: 11/084,854

(22) Filed: Mar. 21, 2005

(30) Foreign Application Priority Data

Nov. 24, 2004 (KR) ............... 20-2004-0033193

(51) Int. Cl.
*B30B 15/00* (2006.01)
(52) U.S. Cl. .......... 156/555; 156/582; 156/583.1
(58) Field of Classification Search ........... 156/499, 156/555, 580, 582, 583.1; 100/327, 160, 100/176
See application file for complete search history.

(56) References Cited

U.S. PATENT DOCUMENTS

| 4,387,000 | A | * | 6/1983 | Tancredi ............ 156/495 |
| 5,071,504 | A | * | 12/1991 | Singer ............ 100/314 |
| 5,540,806 | A | * | 7/1996 | Traise ............ 156/555 |
| 6,874,555 | B1 | * | 4/2005 | Hsiao ............ 156/555 |

* cited by examiner

*Primary Examiner*—James Sells
(74) *Attorney, Agent, or Firm*—Egbert Law Offices

(57) ABSTRACT

The device for actuation of rollers using a feed tray in a laminator. The roller actuating device of the present invention mechanically and simply actuates both a pair of heating rollers for thermal coating of films on both surfaces of an object material and a pair of compressing rollers for compressing and feeding the film-coated object material to the outside. The roller actuating device has a simple structure, thus allowing a user to easily manipulate the laminator.

1 Claim, 4 Drawing Sheets ent a present invention.

DEVICE FOR ACTUATION OF ROLLERS USING A FEED TRAY IN A LAMINATOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to devices for the actuation of rollers in laminators and, more particularly, to a device for the actuation of rollers using a feed tray in a laminator which mechanically and simply actuates both of a pair of heating rollers for thermal coating of films on both surfaces of an object material and a pair of compressing rollers for compressing and feeding the film-coated object material to the outside, thus allowing a user to easily manipulate the laminator.

BACKGROUND OF THE INVENTION

Generally, laminators thermally coat two thin plastic films on both surfaces of an object material using heating rollers and compress both the films and the object material using compressing rollers, thus providing film-coated products. In a conventional laminator having the above-mentioned structure, the respective pair of heating rollers and compressing rollers are repeatedly compressed against each other and spaced apart from each other during coating processes, so as to insert both the object material and the films into a gap between the rollers for coating the film on the object material and remove the film-coated product from the laminator. This operation is executed in every laminator regardless of the size of the laminator.

Conventional laminators are classified into small laminators and large laminators according to the size of object materials. The large laminators can economically coat films, supplied from film rolls, on large object materials. However, a small laminator to be used in general offices or homes has a structure in which a film roll cannot be set in the laminator due to the small size. Accordingly, a user must purchase expensive sheet films and use one sheet film at a time. It is uneconomical.

Furthermore, in conventional laminators, a device for the actuation of heating and compressing rollers has a complex structure using gears operated by electricity. Alternatively, the heating and compressing rollers may be actuated by an air compressor installed in the laminator. Such structures increase the costs of the laminator and, as well, may cause breakdown of the laminator due to the complex structure.

In addition, in the case of the small laminators to be used in small workshops or on worktables, a possible reduction in size of the laminator is limited due to the size of the roller actuating device. Thus, there is difficulty in manufacturing slim laminators.

BRIEF SUMMARY OF THE INVENTION

Accordingly, the present invention has been made keeping in mind the above problems occurring in the prior art, and an object of the present invention is to provide a device for the actuation of rollers using a feed tray in a laminator which mechanically actuates the heating and compressing rollers by controlling only the feed tray without a separate drive unit, thus reducing the manufacturing costs of the laminator, and which has a simple structure unlike conventional laminators, thereby preventing breakdown of the laminator from occurring.

In order to accomplish the above object, the present invention provides a device for the actuation of rollers in a laminator, including: a feed tray having a U-shape, with a stop notch and a coupling slot provided at predetermined positions on each of opposite sides of the feed tray; a plurality of coupling units provided at predetermined positions inside opposite sidewalls of the laminator, with a coupling rail provided on each of the plurality of coupling units while being bent inwards to be inserted into each of the coupling slots of the feed tray; and a plurality of rotating arms each having an L-shape, with a slide slot provided on an upper portion of each of the rotating arms, so that each of the coupling units is movably coupled at a central portion thereof to each of the rotating arms by a locking bolt passing through the slide slot, and both a support shaft and a film supporting shaft provided between the rotating arms in latitudinal directions. The roller actuating device further includes a first link provided on an outer surface of each of opposite sidewalls of the laminator and coupled at a first end thereof to a lockingu hole of an associated coupling unit provided in the laminator through a guide slot of each sidewall of the laminator; a second link coupled at a first end thereof to a second end of the first link and rotatably coupled at a second end thereof to the sidewall of the laminator; a third link coupled at a first end thereof to a central portion of the second link, the third link being vertically movable; and a movable plate coupled to a second end of the third link, so that, when the feed tray rotates downwards, the first link moves downwards and, simultaneously, the movable plate coupled to the first link through the second and third links moves downwards, thus pulling down a guide rod coupled to the movable plate, with a spring fitted over the guide rod while being supported by a guide support, thereby both an upper heating roller and an upper compressing roller move downward due to elasticity of the spring.

BRIEF DESCRIPTION OF THE SEVERAL VIEWS OF THE DRAWINGS

The above and other objects, features and advantages of the present invention will be more clearly understood from the following detailed description taken in conjunction with the accompanying drawings.

DETAILED DESCRIPTION OF THE INVENTION

Hereinafter, a preferred embodiment of the present invention will be described in detail with reference to the accompanying drawings.

Figure 1:
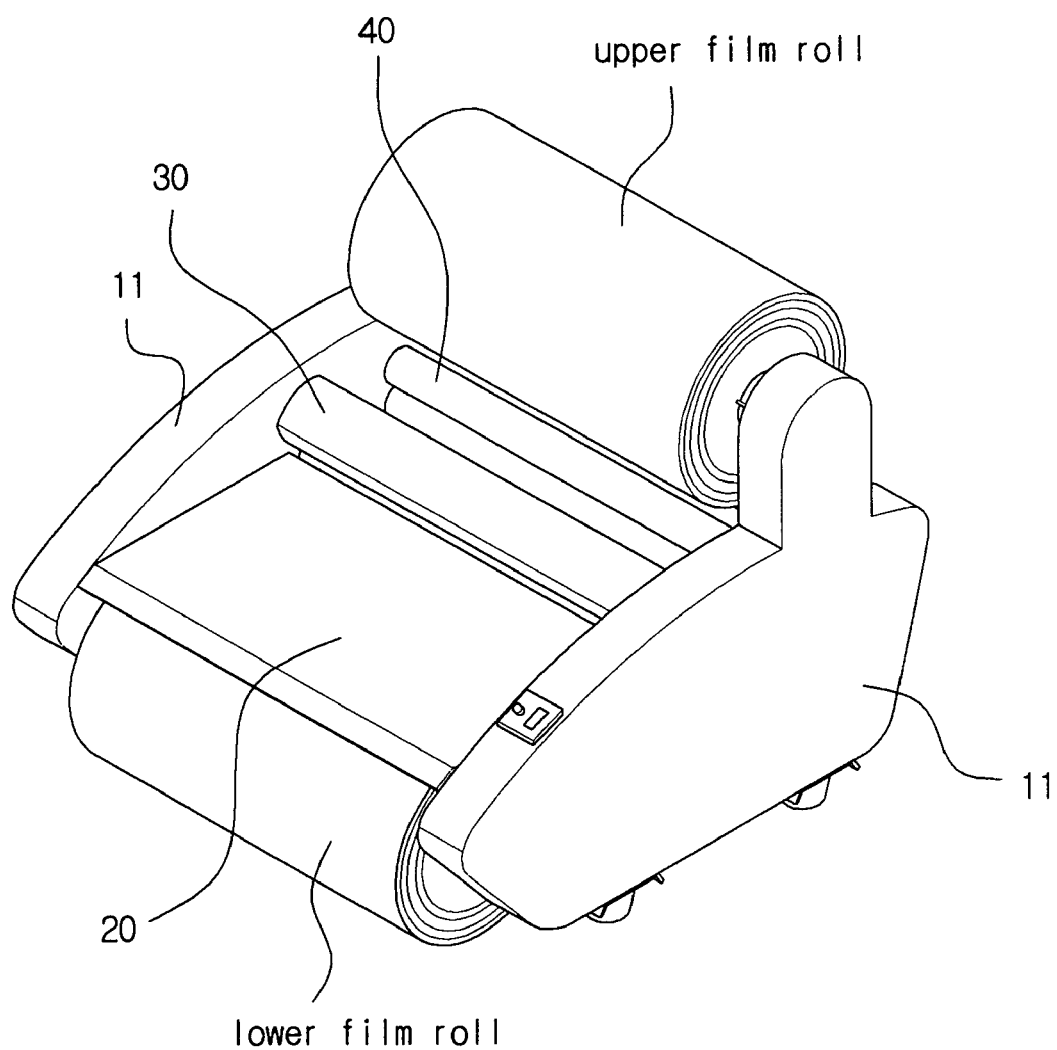
FIG. 1 is a perspective view of a laminator having a device for the actuation of rollers according to an embodiment a present invention.
Figure 2:
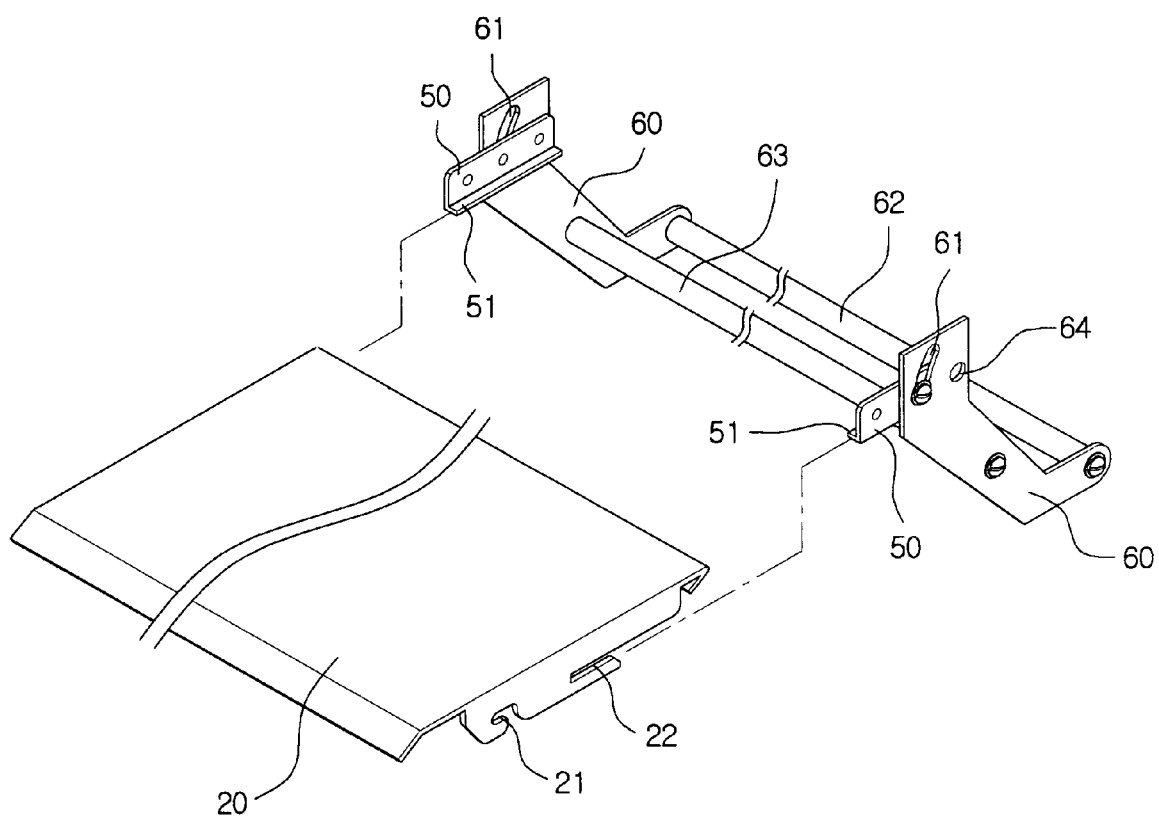
FIG. 2 is a perspective view to show a part of the roller actuating device of FIG. 1 centered on a feed tray.
Figure 3:
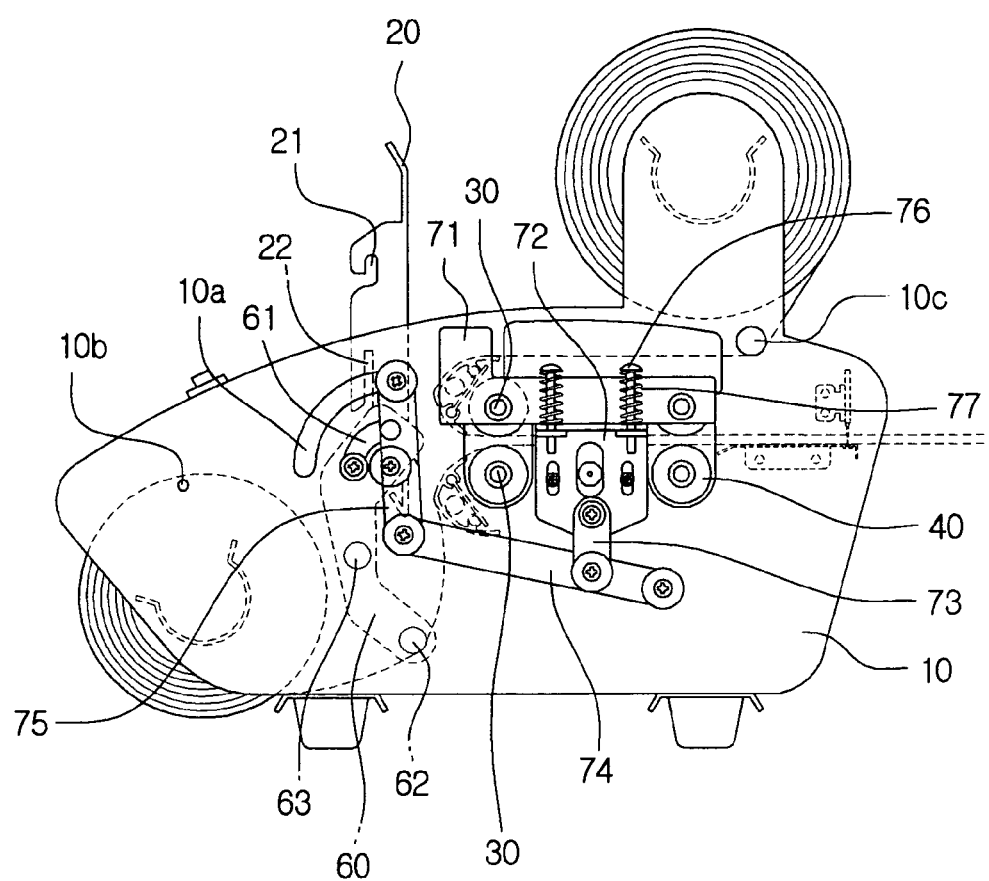
FIG. 3 is a side sectional view to show the roller actuating device of the laminator of FIG. 1, in which corresponding rollers are spaced apart from each other.
Figure 4:
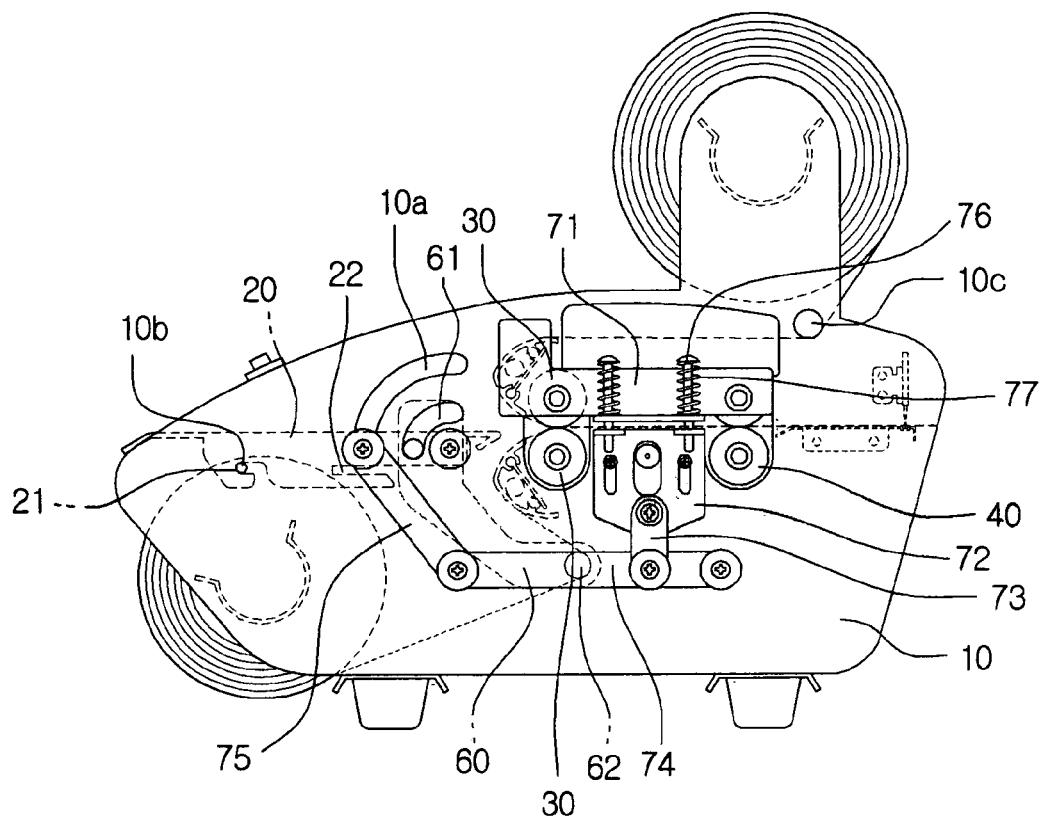
FIG. 4 is another side sectional view to show a compressed state of the corresponding rollers of the roller actuating device of FIG. 3.

FIG. 1 is a perspective view of a laminator having a device for the actuation of rollers according to an embodiment of a present invention. FIG. 2 is a perspective view to show a part of the roller actuating device of FIG. 1 centered on a feed tray 20. FIG. 3 is a side view to show the roller actuating device the laminator of FIG. 1, in which corresponding rollers 30, 40 are spaced apart from each other. FIG. 4 side view to show a compressed state of the corresponding rollers 30 and 40 of the roller actuating device of FIG. 3.

As shown in the laminator having roller the FIG. 1, actuating device according to the present invention includes at both sides thereof a pair of cases 11 each having a 10 sidewall 10 therein. Film rolls are supported between the cases 11 on upper and lower parts of the laminator. The feed tray 20 is provided between the cases 11 on a front part of the laminator. The pair of heating rollers 30 and the pair of compressing rollers 40 are provided at predetermined positions 15 between the cases 11.

The feed tray 20 has a U-shape. A stop notch 21 and a coupling slot 22 are provided at predetermined positions on each of opposite sides of the feed tray 20.

A plurality of rotating arms 60 are provided at predetermined positions in the laminator. A coupling unit 50 is coupled to each of the rotating arms 60 and rotates along a slide slot 61 formed on the rotating arm 60. A coupling rail 51 is provided on each of the coupling units 50 while being bent inwards. Both a support shaft 63 and a film supporting shaft 62 provided rotating in the arms 60 between are latitudinal directions.

A coupling hole 64 is formed at an upper position on each of the rotating arms 60 so that the rotating arm 60 is rotatably coupled to each of the opposite sidewalls 10 of the laminator.

The coupling rail 51 of each of the coupling units 50 is inserted into each of the coupling slots 22 of the feed tray 20. Inner surfaces of the coupling units 50 are in close contact with outer surfaces of the sidewalls of the feed tray 20, thus preventing the feed tray 20 from undesirably moving.

When the feed tray 20 is closed, the stop notches 21 of the feed tray 20 are hooked to stop protrusions 10b provided on the inner surfaces of the opposite sidewalls 10 of the laminator, so that the feed tray 20 is reliably fastened to the opposite sidewalls.

The feed tray 20 can be removed from the laminator only by removing the coupling slots 22 thereof from the coupling rails 51 of the coupling units 50. Thus, in an early stage of a film coating process, an end of a film is easily supplied from the lower film roll to the heating rollers 30 via the film supporting shaft 62, without being blocked by the feed tray 20.

The roller actuating device of the present invention further includes a first link 75 which is provided on an outer surface of each of opposite sidewalls 10 of the laminator and coupled at a first end thereof to a locking hole 52 of an associated coupling unit 50 provided in the laminator through a guide slot 10a of each sidewall 10 of the laminator. The roller actuating device further includes a second link 74 which is coupled at a first end thereof to a second end of the first link 75 and hinged at a second end thereof to the sidewall 10 of the laminator. The roller actuating device further includes a third link 73 which is coupled at a first end thereof to a central portion of the second link 74. The third link 73 is vertically movable. The roller actuating device further includes a movable plate 72 which is coupled to a second end of the third link 73. A guide rod 76 is coupled to the movable pate 72. A spring 77 is fitted over the guide rod 76 while being supported by a guide support 71a. In the laminator with the roller actuating device having the above-mentioned structure, when the feed tray 20 rotates downwards, the first link 75 moves downwards and, simultaneously, the movable plate 72 coupled to the first link 75 through the second and third links 74 and 73 moves downwards, thus pulling down a guide rod 76 coupled to the movable plate. Thereby, both the upper heating roller and the upper compressing roller move downward due to the elasticity of the spring 77.

In detail, the operation of the roller actuating device of the present invention will be described with reference to the drawings.

FIG. 3 is a side view to show the roller actuating device of the laminator of FIG. 1, in which corresponding rollers 30, 40 are spaced apart from each other. FIG. 4 is a side view to show a compressed state of the corresponding rollers 30 and 40 of the roller actuating device of FIG. 3.

First, before the laminator enters the state of FIG. 3, that is, before the feed tray 20 is set in the laminator, ends of films are supplied from the upper and lower film rolls into a gap between the upper and lower heating roller.

Thereafter, as shown in FIG. 3, to couple the feed tray 20 to the coupling units 50 provided on the upper parts of the rotating arms 60 inside the opposite sidewalls 10 of the laminator, the coupling slots 22 of the feed tray 20 are fitted over the coupling rails 51 of the coupling units 50.

In this state, the rotating arms 60 are vertical. The lower film sags below the film supporting shaft 62 of the rotating arms 60. The first link 75 is set in the same the feed tray 20, that is, in the vertical direction as direction. The first end of the second link 74, which is coupled to the first link 75, is placed at an upper position. Thereby, the third link 73 coupled to the second link 74 moves upwards. Thus, the movable plate 72 coupled to the third link 73 also moves upwards. As a result, the upper heating roller 30 and the upper compressing roller 40 move upwards, so that the heating and compressing rollers 30 and 40 are spaced apart from each other.

In the above state, if a user rotates the feed tray 20 downwards to compress the heating and compressing rollers 30 and 40, the stop notches 21 of the feed tray 20, are hooked to the stop protrusions formed on the inner surfaces of the opposite sidewalls 10 of the laminator. Simultaneously, the coupling unit 50, inserted in the coupling slots 22 of the feed tray 20, rotates downwards. Thus, the rotating arms 60 coupled to the coupling units 50 are rotated around the coupling holes 64 thereof. As a result, the lower film, which has sagged below the film supporting shaft 62 of the rotating arms 60, becomes tense due to the film supporting shaft 62.

While the above-mentioned operation is executed inside the opposite sidewalls 10 of the laminator, the following operation is executed outside the opposite sidewalls 10. Due to the rotation of the feed tray 20, the first link 75, coupled to each coupling unit 50 through each guide slot 10a of the opposite sidewalls 10 of the laminator, rotates downwards along with the coupling unit 50. Simultaneously, the second link 74, coupled to the second end of the first link 75, moves downwards. Thereby, the third link 73, coupled to the second link 74, moves downwards, so that the movable plate 72 moves downwards along with the guide rod 76 while compressing the spring 77 which is fitted over the guide rod 76 and supported by the guide support 71*a*. Thus, both the upper heating roller 30 and the upper compressing roller 40 are moved downwards. As a result, the respective pairs of heating and compressing rollers 30 and 40 are compressed against each other.

As described above, the present invention provides a device for the actuation of rollers using a feed tray in a laminator which can economically laminate an object material regardless of the length of the object material, unlike conventional laminators which require expensive sheet films to laminate even small object materials. Furthermore, rollers are simply compressed against each other and spaced apart from each other only by rotating the feed tray vertically. Therefore, in an early stage, film consumption is minimized. As well, the roller actuating device of the present invention prevents a user from mistakenly failing to operate a roller compressing unit after films are set.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. A device for actuation of rollers in a laminator, comprising:
   a feed tray having a U-shape, with a stop notch and a coupling slot provided at predetermined positions on each of opposite sides thereof;
   a plurality of coupling units provided at predetermined positions inside opposite sidewalls of the laminator, with a coupling rail provided on each of the plurality of coupling units while being bent inwards to be inserted into each of the coupling slots of the feed tray;
   a plurality of rotating arms each having an L-shape, with a slide slot provided on an upper portion of each of the rotating arms, so that each of the coupling units is movably coupled at a central portion thereof to each of the rotating arms by a locking bolt passing through the slide slot, and both a support shaft and a film supporting shaft provided between the rotating arms in latitudinal directions;
   a first link provided on an outer surface of each of opposite sidewalls of the laminator and coupled at a first end thereof to a locking hole of an associated coupling unit provided in the laminator through a guide slot of each sidewall of the laminator;
   a second link coupled at a first end thereof to a second end of the first link and rotatably coupled at a second end thereof to the sidewall of the laminator;
   a third link coupled at a first end thereof to a central portion of the second link, the third link being vertically movable; and
   a movable plate coupled to a second end of the third link, so that, when the feed tray rotates downwards, the first link moves downwards and, simultaneously, the movable plate coupled to the first link through the second and third links moves downwards, thus pulling down a guide rod coupled to the movable plate, with a spring fitted over the guide rod while being supported by a guide support, thereby both an upper heating roller and an upper compressing roller move downward due to elasticity of the spring.

* * * * *